(12) United States Patent
Boon (10) Patent No.: US 11,808,314 B2
(45) Date of Patent: Nov. 7, 2023

(54) METHOD OF DISENGAGING A CLUTCHING DEVICE AND ELECTRIC DRIVELINE

(71) Applicant: Dana Belgium N.V., Bruges (BE)

(72) Inventor: Fabrice Boon, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/823,457

(22) Filed: Aug. 30, 2022

(65) Prior Publication Data
US 2023/0063948 A1 Mar. 2, 2023

(30) Foreign Application Priority Data
Aug. 31, 2021 (DE) ............. 10 2021 122 500.0

(51) Int. Cl.
*F16D 48/06* (2006.01)
*F16D 23/02* (2006.01)
*F16D 27/00* (2006.01)

(52) U.S. Cl.
CPC ............ *F16D 48/064* (2013.01); *F16D 23/02* (2013.01); *F16D 27/00* (2013.01); *F16D 2500/10412* (2013.01); *F16D 2500/10462* (2013.01); *F16D 2500/3067* (2013.01); *F16D 2500/3068* (2013.01); *F16D 2500/30421* (2013.01); *F16D 2500/30803* (2013.01); *F16D 2500/30806* (2013.01); *F16D 2500/50615* (2013.01)

(58) Field of Classification Search
CPC ......... F16D 2500/50615; F16D 48/064; F16D 23/02; F16D 27/00; F16D 27/118; F16D 2500/10412; F16D 2500/10462; F16D 2500/10456; F16D 2500/30421; F16D 2500/30425; F16D 2500/3067; F16D 2500/3068; F16D 2500/30806; F16D 2500/30803; F16D 2500/7082
See application file for complete search history.

(56) References Cited

U.S. PATENT DOCUMENTS

| | | | | |
|---|---|---|---|---|
| 6,319,168 | B1* | 11/2001 | Morris | B60K 6/54 903/917 |
| 2012/0234120 | A1* | 9/2012 | Fukuda | B60K 17/165 192/84.1 |
| 2012/0253577 | A1* | 10/2012 | Schaeffer | B60W 20/40 903/914 |
| 2021/0172519 | A1* | 6/2021 | Martin | F16D 41/082 |
| 2022/0194224 | A1* | 6/2022 | Yoon | F16D 48/06 |

* cited by examiner

*Primary Examiner* — Timothy Hannon
(74) *Attorney, Agent, or Firm* — McCoy Russell LLP (57) ABSTRACT

The present document relates to a method of disengaging a clutching device. The method comprises sweeping an output torque of an electric motor drivingly connected to the clutching device such that a torque transmitted by the clutching device vanishes at least temporarily during the sweep, and disengaging the clutching device during the sweep. The present document further relates to an electric driveline for carrying out the method.

15 Claims, 6 Drawing Sheets

METHOD OF DISENGAGING A CLUTCHING DEVICE AND ELECTRIC DRIVELINE

CROSS-REFERENCE TO RELATED APPLICATION

The present application claims priority to German Patent Application No. 10 2021 122 500.0, entitled "METHOD OF DISENGAGING A CLUTCHING DEVICE AND ELECTRIC DRIVELINE", and filed on Aug. 31, 2021. The entire contents of the above-listed application is hereby incorporated by reference for all purposes.

TECHNICAL FIELD

The present disclosure relates to a method of disengaging a clutching device, and to an electric driveline for carrying out the method.

BACKGROUND AND SUMMARY

Drivelines, for example drivelines for automotive vehicles, typically include one or more clutching devices for selectively coupling and decoupling a power source such as an engine or an electric motor to and from a vehicle output such as a drive shaft, a differential or one or more wheels. Some drivelines also include a plurality of clutching devices for selecting different gear ratios between the power source and the vehicle output.

In order to reduce wear of the clutching device and to provide a smooth disengagement, an output torque of the power source drivingly connected to the clutching device is often reduced to zero before or right before the clutching device is opened or disengaged. Disengagement of the clutching device is then usually triggered when or once the output torque of the power source has been reduced to zero.

However, due to frictional and inertial forces within the driveline, a torque transmitted by the clutching device often does not vanish even when the output torque of the power source drivingly connected to the clutching device has been reduced to zero. This torque transmitted by the clutching device usually gives rise to a resistance or force which needs to be overcome for the clutching device to be opened or disengaged. Consequently, the clutching device normally needs to have a certain minimum size and an actuator for disengaging the clutching device normally needs to be capable of providing a required minimum force. Both of these requirements may lead to high production costs and a may necessitate a large space for the clutching device.

The present disclosure therefore addresses the problem of providing a method of disengaging a clutching device and a driveline for carrying out the method which may reduce production costs and/or space requirements.

This problem is solved by a method and by an electric driveline according to the independent claims. Special embodiments are described in the dependent claims.

The presently proposed method of disengaging a clutching device comprises the steps:
  sweeping an output torque of an electric motor drivingly connected to the clutching device such that a torque transmitted by or via the clutching device vanishes at least temporarily during the sweep, and
  disengaging the clutching device during the sweep.
And the presently proposed electric driveline includes:
  an electric motor,
  a clutching device, for example a dog clutch or a synchronizer, drivingly connected to the electric motor, and
  a control unit configured to sweep an output torque of the electric motor such that a torque transmitted by or via the clutching device vanishes at least temporarily during the sweep, and configured to disengage the clutching device during the sweep.

Sweeping the output torque of the electric motor such that the torque transmitted by or via the clutching device vanishes at least temporarily during the sweep reduces the force needed to disengage the clutching device. In this manner, mechanical wear of the clutching device may be reduced, and the clutching device and/or an actuator for disengaging the clutching device can be designed smaller and cheaper. Also, a duration of the disengagement process may be reduced. Sweeping the output torque of the electric motor typically includes continuously and/or monotonously increasing, for example at least temporarily, and/or continuously and/or monotonously decreasing the output torque of the electric motor, for example at least temporarily.

The method may further include estimating, before or right before the sweep, a torque transmitted by or via the clutching device at zero output torque of the electric motor, for example at a current driveline operating point. For instance, the current driveline operating point may be characterized by one or more driveline parameter values which may include one or more of a speed and/or an acceleration of the electric motor or of an input of the clutching device, a gear selection, and a transmission temperature. The sweeping of the output torque may then include sweeping the output torque across an output torque value having a magnitude or absolute value which corresponds to the magnitude or the absolute value of the estimated torque or the estimate of the torque transmitted by or via the clutching device at zero output torque of the electric motor. A non-zero gear ratio or drive ratio between the electric motor and the clutching device may be taken into account during the sweep.

Or in other words, the control unit may be configured to estimate, before or right before the sweep, the torque transmitted by the clutching device at zero output torque of the electric motor, for example at the current driveline operating point mentioned above. The control unit may be configured to sweep the output torque of the electric motor across an output torque value having a magnitude or absolute value which corresponds to the magnitude or absolute value of the estimated torque or of the estimate of the torque transmitted by the clutching device at zero output torque of the electric motor. The direction of the output torque of the electric motor during the sweep is typically chosen such as to compensate the estimated torque or the estimate of the torque transmitted by the clutching device at zero output torque of the electric motor, so that the torque difference or the actual torque transmitted by the clutching device vanishes at least temporarily during the sweep. In this way, a force needed to disengage the clutching device may be reduced. The control unit may be configured to take into account a non-zero gear ratio or drive ratio between the electric motor and the clutching device during the sweep.

The torque transmitted by the clutching device at zero output torque of the electric motor may be estimated based on one or more driveline parameters or based on one or more driveline parameter values which may include one or more of:

a speed of the electric motor or a speed of an input of the clutching device, for example before or right before the sweep, an acceleration of the electric motor or an acceleration of the input of the clutching device, for example before or right before the sweep, a gear selection, for example before or right before the sweep, and a transmission temperature, for example before or right before the sweep.

For example, the control unit may be configured to estimate the torque transmitted by the clutching device at zero output torque of the electric motor based on one or more driveline parameters or based on one or more driveline parameter values including one or more of:

a speed of the electric motor, for example before or right before the sweep, an acceleration of the electric motor, for example before or right before the sweep, a gear selection before or right, for example before the sweep, and a transmission temperature, for example before or right before the sweep.

Additionally or alternatively, the torque transmitted by the clutching device at zero output torque of the electric motor may be estimated based on test data mapping one or more driveline parameter values including one or more of:

speed values of the electric motor or of the input of the clutching device, acceleration values of the electric motor or of the input of the clutching device, different gear selections, and transmission temperature values to values, for example measured values, of the torque transmitted by the clutching device at zero output torque of the electric motor.

For instance, the control unit may be configured to estimate the torque transmitted by the clutching device at zero output torque of the electric motor further based on test data mapping one or more driveline parameter values including one or more of:

speed values of the electric motor, acceleration values of the electric motor, different gear selections, and transmission temperature values to values, for example measured values, of the torque transmitted by the clutching device at zero output torque of the electric motor.

In this manner, the accuracy of the estimate may be improved and the force needed to disengage the clutching device may be reduced. The transmission temperature may include a temperature of a lubricant used to lubricate and/or to cool a transmission including the clutching device. For example, determining the transmission temperature may include determining a temperature of a lubricant held in a lubricant sump of the transmission.

An amplitude of the electric motor output torque sweep, that is the magnitude or absolute value of a difference between a smallest and a greatest value of the output torque of the electric motor during the sweep, may be at least four times an output torque control error of the electric motor. For example, the control unit may be configured to sweep the output torque of the electric motor such that an amplitude of the sweep is at least four times an output torque control error of the electric motor. In this manner, the probability of at least temporarily reducing the actual torque transmitted by the clutching device to zero during the sweep may be increased, and the force needed to disengage the clutching device may be lowered.

Typically, the sweep may be performed such that the estimated torque or the estimate of the torque transmitted by the clutching device at zero output torque of the electric motor lies in between a smallest and a greatest value of the output torque of the electric motor during the sweep. For instance, the smallest and the greatest value of the output torque of the electric motor during the sweep may be chosen such that the estimated torque or the estimate of the torque transmitted by the clutching device at zero or output torque of the electric motor divides the output torque interval defined by the smallest and the greatest value of the output torque of the electric motor during the sweep into to equal subintervals.

Disengagement of the clutching device may be initiated before the sweep or at the beginning of the sweep. Or in other words, the control unit may be configured to initiate disengagement of the clutching device before the sweep or at the beginning of the sweep, for example by means of an electromagnetic actuator such as a solenoid. In this manner, the clutching device may disengage or open fast and easily, for example once frictional and/or inertial forces between an input and an output of the clutching device are sufficiently reduced, for example once they are reduced below a threshold.

The output torque of the electric motor may be reduced to zero when or once an acceleration of the electric motor following disengagement of the clutching device exceeds a predetermined threshold. Or in other words, the control unit may be configured to reduce the output torque of the electric motor to zero when or once an acceleration of the electric motor following disengagement of the clutching device exceeds a predetermined threshold. In this manner, a sudden and possibly unwanted acceleration of the electric motor following disengagement of the clutching device may be contained. For instance, the acceleration of the electric motor exceeding the predetermined threshold may be used as an indicator that the clutching device has been disengaged or opened.

BRIEF DESCRIPTION OF THE FIGURES

Embodiments of the presently proposed electric driveline and method are illustrated in the figures and are explained in the following detailed description.

DETAILED DESCRIPTION

Figure 1:
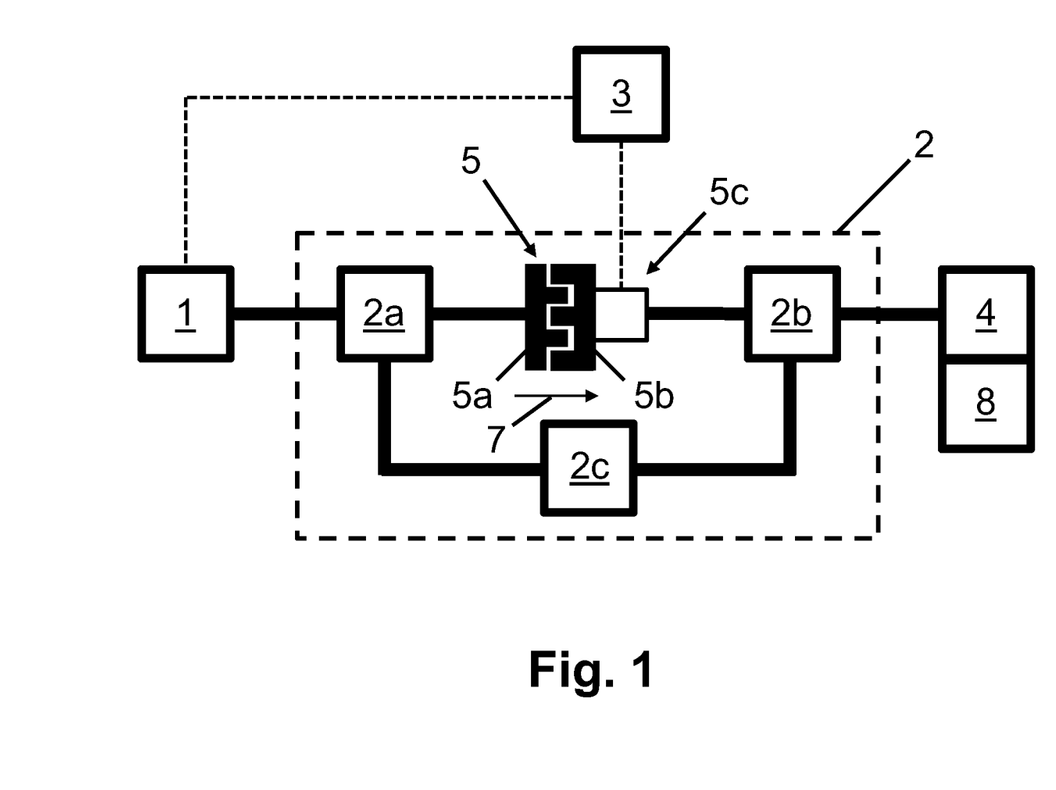
FIG. 1 schematically depicts an embodiment of an electric driveline including an electric motor drivingly connected to a clutching device.

FIG. 1 schematically shows an embodiment of an electric driveline 100 of the presently proposed type. The driveline 100 may be used in or for a vehicle, for example. The driveline 100 comprises an electric motor 1, a transmission 2, and a control unit 3. In the embodiment depicted here, the driveline 100 further comprises a vehicle output 4. The electric motor 1 may include an AC motor such as a synchronous or asynchronous AC motor, or a DC motor, for example. The transmission 2 drivingly connects or selectively drivingly connects the electric motor 1 to the vehicle output 4. The vehicle output 4 may comprise one or more of a drive shaft, a differential, one or more axle half shafts, one or more reduction drives and one or more wheels, for example. The transmission 2 includes a clutching device 5 having an input 5a and an output 5b. The clutching device 5 may comprise an actuator 5c for selectively engaging and/or disengaging the input 5a with or from the output 5b. Also, the clutching device 5 may comprise a biasing member such as a spring. For example, the biasing member may bias the clutching device to the closed or engaged position, or the biasing member may bias the clutching device to the open or disengaged position. The transmission 2 may further comprise transmission portions 2a, 2b, 2c. In alternative embodiments the transmission 2 may not include the transmission portions 2a, 2b, 2c, or the transmission 2 may only include one or any two of the transmission portions 2a, 2b, 2c depicted here.

In the embodiment depicted in FIG. 1 the transmission portion 2a drivingly connects or selectively drivingly connects the electric motor 1 to the input 5a of the clutching device 5. For example, the transmission portion 2a may include one or more of: one or more shafts, one or more gears or gear ratios, one or more clutching devices, one or more belts, or combinations thereof. The transmission portion 2b drivingly connects or selectively drivingly connects the output 5b of the clutching device 5 to the vehicle output 4. For example, the transmission portion 2b may include one or more of: one or more shafts, one or more gears or gear ratios, one or more clutching devices, one or more belts, or combinations thereof. And the transmission portion 2c may drivingly connect or selectively drivingly connects the transmission portion 2a to the transmission portion 2b, in parallel to the clutching device 5. For example, the transmission portion 2c may include one or more of: one or more shafts, one or more gears or gear ratios, one or more clutching devices, one or more belts, or combinations thereof.

The control unit 3 typically comprises electric circuitry and may include a programmable processing unit such as a microprocessor, a Field Programmable Gate Array (FPGA), or the like. The control unit 3 is configured to control the electric motor 1 and the clutching device 5, such as the actuator 5c of the clutching device 5. For example, the control unit 3 may be in communication with the electric motor 1 and with the clutching device 5 and/or with the actuator 5c via a wired or wireless connection, indicated by dashed lines in FIG. 1. The control unit 3 is configured to control an output torque and/or an output speed of the electric motor 1. And the control unit 3 may be configured to control the actuator 5c to selectively either one of engage and disengage the clutching device 5. That is, the control unit 3 may be configured to control the state of the clutching device 5 by selectively switching the clutching device 5 between the closed or engaged state and the open or disengaged state.

Figure 2A:
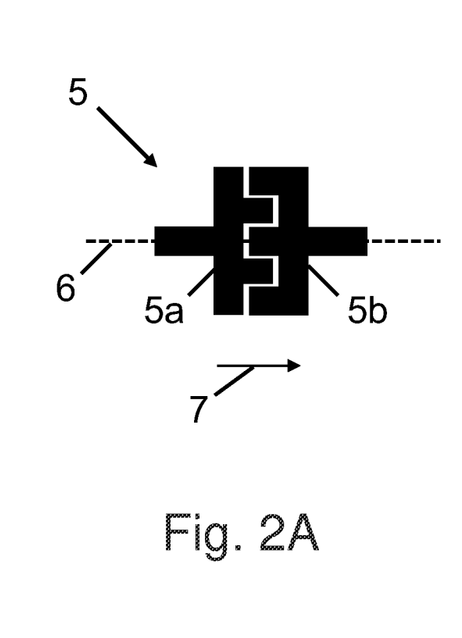
FIG. 2A schematically shows the clutching device of FIG. 1 in an engaged state.
Figure 2B:
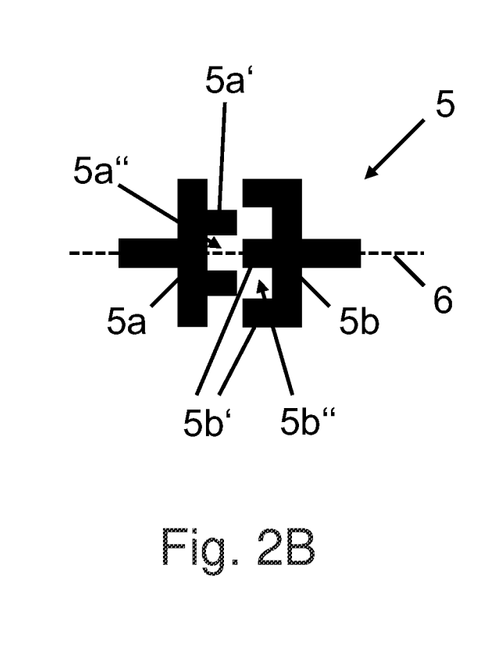
FIG. 2B schematically shows the clutching device of FIG. 1 in a disengaged state.

FIGS. 2A and 2B illustrate a schematic view of the clutching device 5 of FIG. 1, respectively. Here and in all of the following features recurring in different figures are designated with the same reference signs. Specifically, FIG. 2A shows the clutching device 5 of FIG. 1 in a closed or engaged state or configuration in which the input 5a and the output 5b of the clutching device 5 are drivingly engaged with each other so that torque may be transferred between the input 5a and the output 5b. And FIG. 2B shows the clutching device 5 of FIG. 1 in an open or disengaged state or configuration in which the input 5a and the output 5b of the clutching device 5 are disengaged from each other so that no torque may be transferred between the input 5a and the output 5b.

In the embodiment depicted in FIGS. 1, 2A and 2B the clutching device 5 is configured as a dog clutch. For example, the input 5a of the clutching device 5 may comprise a plurality of dogs 5a' extending along an axis of rotation 6 of the clutching device 5 and being alternatingly disposed along an annular circumference of the input 5a. Recesses 5a" may be formed in between each pair of neighbouring dogs 5a' along the circumference of the input 5a, respectively. Similarly, the output 5b of the clutching device 5 may comprise a plurality of dogs 5b' extending along the axis of rotation 6 and being alternatingly disposed along an annular circumference of the output 5b. Recesses 5b" may be formed in between each pair of neighbouring dogs 5b' along the circumference of the output 5b, respectively.

The dogs 5a' and recesses 5a" of the input 5a and the dogs 5b' and recesses 5b" of the output 5b of the clutching device 5 may have complementary shapes. That is, the dogs 5a' and recesses 5a" of the input 5a and the dogs 5b' and recesses 5b" of the output 5b may be shaped such that the dogs 5b' of the output 5b may be accommodated or received in the recesses 5a" of the input 5a, and, simultaneously, the dogs 5a' of the input 5a may be accommodated or received in the recesses 5b" of the output 5b, so as to engage the input 5a and the output 5b with one another and close the clutching device 5, as shown in FIG. 2A. From the closed or engaged state of the clutching device 5 shown in FIG. 5A the clutching device 5 may be transferred to the open or disengaged state shown in FIG. 2B by moving the output 5b away from the input 5a and/or by moving the input 5a away from the output 5b along the rotation axis 6 so as to disengage the dogs 5a', 5b'. And from the open or disengaged state of the clutching device 5 shown in FIG. 2B the clutching device 5 may be transferred back to the closed or engaged state shown in FIG. 2A by moving the output 5b toward the input 5a and/or by moving the input 5a toward the output 5b along the rotation axis 6 and by engaging the dogs 5a', 5b' with one another as described above.

In an alternative embodiment of the driveline 100 not explicitly depicted here, the clutching device 5 may be configured as a synchronizer. For example, each of the input 5a and the output 5b may include a friction disc, wherein the friction disc of the input 5a and the friction disc of the output 5b are configured to be frictionally engaged with one another. Additionally, the clutching device 5 may include a movable locking member such as a shift collar. When the friction discs of the input 5a and the output 5b have been frictionally engaged and rotate with the same or essentially the same speed, the input 5a and the output 5b may be rotationally locked to one another by means of the movable locking member.

A torque transmitted by or via the dogs 5a', 5b' of the clutching device 5 during the process of disengaging the dogs 5a', 5b' may cause friction between the dogs 5a', 5b' and unwanted wear. Additionally, the actuator 5c has to provide a greater force in order to disengage the dogs 5a', 5b' against the friction between the dogs 5a', 5b'. When the clutching device 5 comprises or is configured as a synchronizer as described above, similar problems may arise when the locking member is moved to rotationally unlock the friction discs. In order to address this problem, the presently proposed electric driveline and disengagement method aim at reducing the torque transmitted by or via the clutching device 5 during disengagement.

Figure 3:
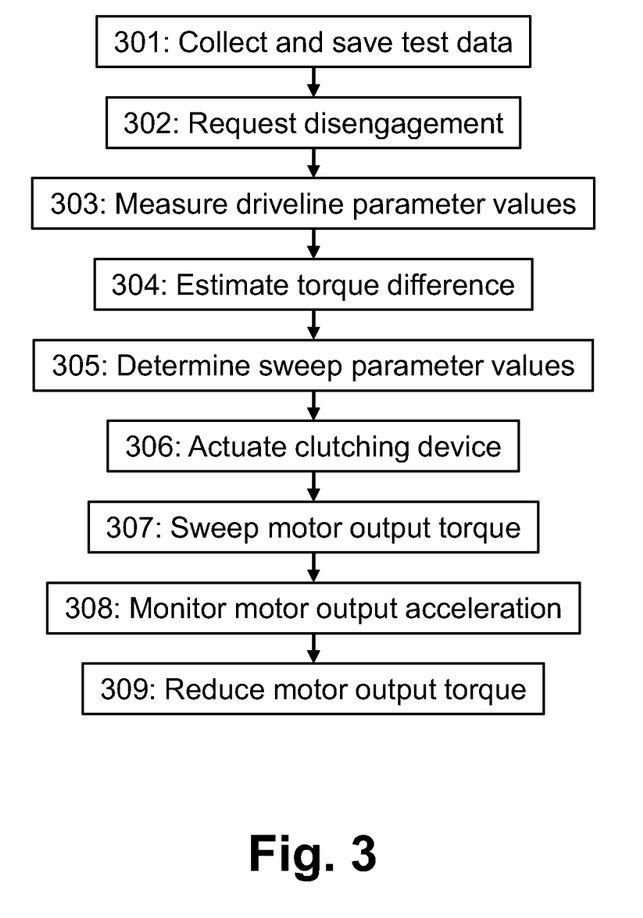
FIG. 3 schematically shows steps of an embodiment of a method of disengaging the clutching device of FIG. 1.

FIG. 3 shows a flow diagram including steps of an embodiment of the presently proposed method of disengaging the clutching device 5 of FIG. 1. The method is further explained with reference to FIGS. 4-6. The control unit 3 of the electric driveline 100 of FIG. 1 may be configured to carry out the method steps of FIG. 3.

At 301 test data is measured and subsequently saved or stored, for example in a permanent memory of or in communication with the control unit 3. For example, step 301 may be carried out with the electric driveline 100 or a vehicle including the electric driveline 100 placed on a test bench. By contrast, the remaining steps 302 to 309 depicted in FIG. 3 are usually carried out during normal operation of the electric driveline 100 or of a vehicle including the electric driveline 100 via the control unit in communication with sensors and actuators as described herein. The test data usually map a plurality of measured driveline parameter values characterising a state of the driveline 100 of FIG. 1, for example before or right before disengagement of the clutching device 5, to a measured torque transmitted by or via the clutching device 5 at zero output torque of the electric motor 1. Said torque transmitted by or via the clutching device 5 at zero electric motor output torque is typically measured right after the output torque of the electric motor 1 has been reduced to zero. In this way, the measured torque transmitted by or via the clutching device 5 may resemble the torque transmitted by or via the clutching device 5 during a conventional disengagement process where the motor output torque is reduced to zero right before the clutching device 5 is disengaged, for example in order to reduce clutch wear and to provide a smooth disengagement. The presently proposed electric driveline and method aim at further improving this conventional process.

The measured driveline parameter values may include a speed of the electric motor 1 or a speed of the input 5a of the clutching device 5. Or in other words, measuring or collecting the driveline parameter values may include measuring a speed of the electric motor 1 or a speed of the input 5a of the clutching device 5. Alternatively, a speed of another driveline component may be measured. The speed of the electric motor 1 or of the input 5a of the clutching device 5 may then be determined based on a known gear ratio or drive ratio between said other driveline component and the electric motor 1 or the input 5a of the clutching device 5. For instance, in the embodiment of the electric driveline 100 depicted in FIG. 1 the speed of the electric motor 1 could be determined based on a speed of the vehicle output 4 and the gear ratio provided by the transmission portions 2a and 2b drivingly connecting the electric motor 1 to the vehicle output 4. For example, the electric driveline 100 may include one or more speed sensors in communication with the control unit 3 for measuring the speed of the electric motor 1, of the input 5a of the clutching device 5, or of another driveline component. For example, it may be convenient to measure the speed of the electric motor 1 using an internal speed sensor of the electric motor 1. Such an internal motor speed or position sensor is sometimes referred to as a "reluctance resolver".

Additionally or alternatively, the measured driveline parameter values may include an acceleration of the electric motor 1 or an acceleration of the input 5a of the clutching device 5. Or in other words, measuring or collecting the driveline parameter values may include measuring an acceleration of the electric motor 1 or an acceleration of the input 5a of the clutching device 5. Typically, the acceleration of the electric motor 1 is determined from the speed of the electric motor 1, from the speed of the input 5a of the clutching device 5, or from the speed of another driveline component via differentiation.

Additionally or alternatively, the measured driveline parameter values may include a gear selection or gear ratio, for example a gear selection or gear ratio of the transmission 2. Or in other words, measuring or collecting the driveline parameter values may include determining a gear selection or gear ratio, for example a gear selection or gear ratio of the transmission 2. For example, the gear ratio or gear selection may be determined by determining the state of one or more clutching devices in the transmission. To that end, the driveline 100 may include one or more position sensors (such clutch position sensors) and/or one or more clutch pressure sensors in communication with the control unit 3, for example.

Additionally or alternatively, the measured driveline parameter values may include a temperature of the transmission 2 or of a lubricant such as oil held within or circulating within the transmission 2. Or in other words, measuring or collecting the driveline parameter values may include measuring a temperature of the transmission 2 or of a lubricant such as oil held in or circulating in the transmission 2. For example, the lubricant temperature may be measured in a lubricant sump within the transmission 2. To that end, the driveline 100 may include one or more temperature sensors in communication with the control unit 3.

The test data further include the above-mentioned measured torque transmitted by or via the clutching device 5 at zero electric motor output torque. Said torque transmitted by the clutching device 5 at zero output torque of the electric motor 1 is typically caused by frictional or inertial forces within the electric driveline 100 and may vary depending on a state of the driveline 100, which may be characterised by one or more of the above-mentioned driveline parameter values. Typically, said torque transmitted by the clutching device 5 is measured or determined concurrently with or right after the aforementioned driveline parameter value measurement in order to determine the relation between the current driveline parameter values and the torque transmitted by the clutching device 5 at zero output torque of the electric motor 1 with a sufficient degree of precision. For example, a time interval $\Delta t_{measurement}$ during which the driveline parameter values and the torque transmitted by the clutching device 5 at zero electric motor output torque are measured or determined may be short compared to the duration $\Delta t_{disengagement}$ of the process of disengaging the clutching device 5. For example, one of the following relations may hold: $\Delta t_{measurement} < 0.2 \cdot \Delta t_{disengagement}$, or $\Delta t_{measurement} < 0.1 \cdot \Delta t_{disengagement}$.

In order to measure or determine the torque transmitted by the clutching device 5 at zero output torque of the electric motor 1, the electric driveline 100 may comprise a torque transducer 8. For example, the torque transducer 8 may include one or more strain gauges. The torque transducer 8 may be in communication with the control unit 3 or with another data acquisition device. The torque transducer 8 may be positioned on or at the vehicle output 4 for determining or measuring the torque transmitted by the clutching device 5. Alternatively, the torque transducer 8 may be positioned on or at another driveline component drivingly connecting the clutching device 5 to the vehicle output 4 (not shown). In case a gear ratio between the clutching device 5 and the driveline component on which or at which the torque transducer 8 is positioned is non-zero, the torque transmitted by the clutching device 5 is usually determined based on the torque value measured by the torque transducer 8 and based on said non-zero gear ratio between the clutching device 5 and the driveline component on which or at which the torque transducer 8 is positioned. Optionally, the measured value of the torque transmitted by the clutching device 5 may further be based on modelled torque losses between the clutching device 5 and the driveline component on which or at which the torque transducer 8 is positioned. For example, said torque losses may include friction losses of bearings and/or gears, and/or churning losses of driveline components rotating in a lubricant sump.

Figure 4:
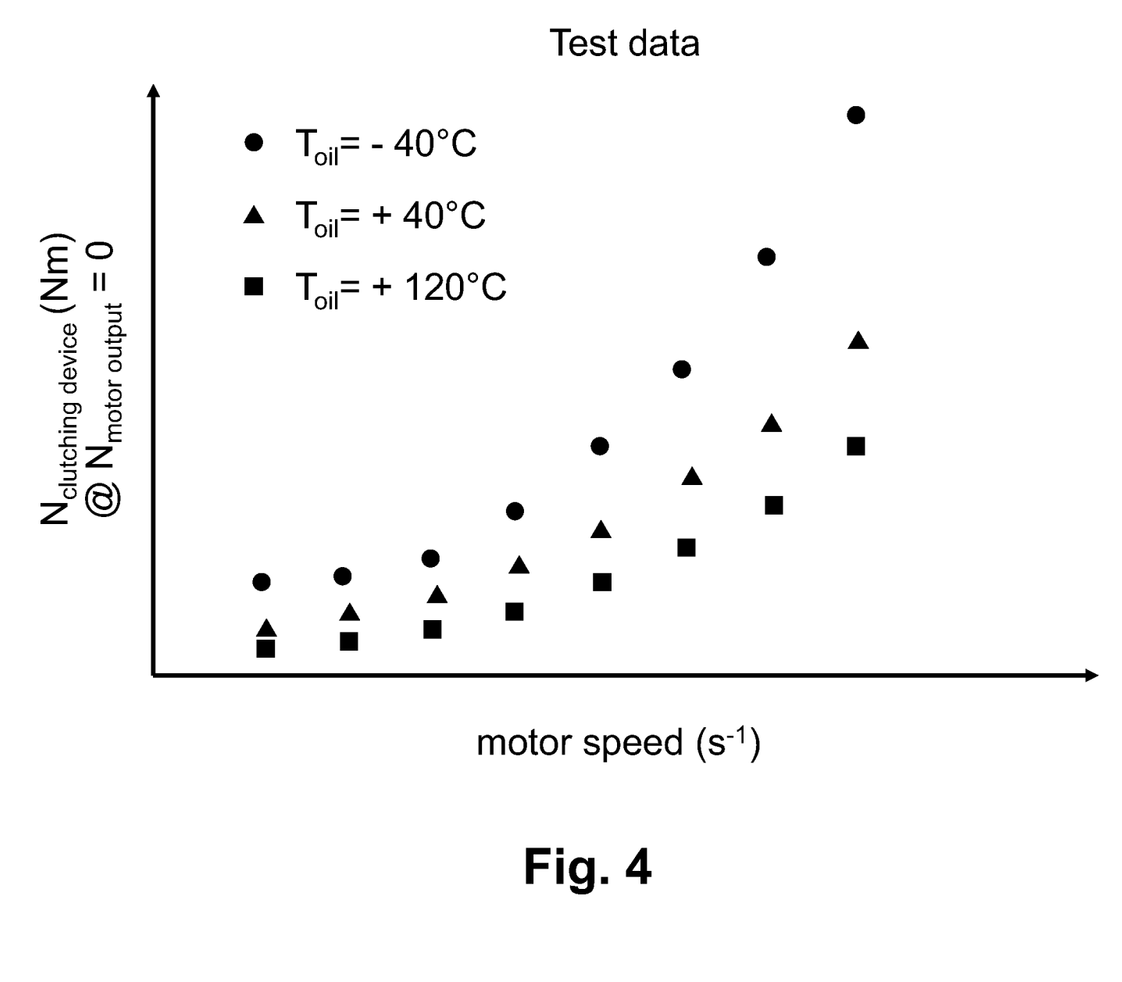
FIG. 4 schematically shows test data mapping measured driveline parameter values to a measured torque transmitted by the clutching device of FIG. 1 at zero output torque of the electric motor.

FIG. 4 qualitatively shows an example of a corresponding test data set, or of a subset of a corresponding test data set. More specifically, the graph depicted in FIG. 4 illustrates the relation between the torque transmitted by the clutching device 5 of FIG. 1 at zero output torque of the electric motor 1 and a speed of the electric motor 1. The depence of the torque transmitted by the clutching device 5 on the speed of the electric motor 1 is shown for different values of a temperature of a lubricant such as oil held or circulating within the transmission 2 including the clutching device 5. FIG. 4 illustrates that for a given lubricant temperature the torque transmitted by the clutching device 5 at zero electric motor output torque typically caused by frictional and/or inertial forces within the driveline 100 increases with increasing speed of the electric motor 1. Further, at a given value of the speed of the electric motor 1 the torque transmitted by the clutching device 5 decreases with increasing lubricant temperature. Additionally or alternatively, the test data may include the torque transmitted by the clutching device 5 of FIG. 1 at zero output torque of the electric motor 1 for different values of an acceleration of the electric motor 1 or of the input 5a and/or for different gear ratios or drive ratios of the transmission 2 (not shown).

Back to FIG. 3, at 302 disengagement of the clutching device 5 is requested. Usually, the disengagement request is sent to the control unit 3. For example, during normal operation of the electric driveline 100 or of a vehicle including the electric driveline 100 disengagement of the clutching device 5 may be requested automatically or manually in order to decouple the vehicle output 4 from the electric motor 1. Alternatively, during normal operation of the electric driveline 100 or of a vehicle including the electric driveline 100 disengagement of the clutching device 5 may be requested automatically or manually in order to hand over torque transmission from one set of gears of the transmission 2 providing a first drive ratio or gear ratio between the electric motor 1 and the vehicle output 4 to a second set of gears of the transmission 2 providing a second drive ratio or gear ratio between the electric motor 1 and the vehicle output 4.

At 303 current driveline parameter values are measured or determined. Usually, the measurement of the driveline parameter values is initiated by the control unit 3. The measurement of driveline parameter values at 303 may be carried out in analogy to the measurement of driveline parameter values at 301 described above. That is, the measuring or determining of driveline parameter values at 303 may include one or more of measuring or determining a current speed of the electric motor 1 or of the input 5a of the clutching device 5, measuring or determining a current acceleration of the electric motor 1 or of the input 5a of the clutching device 5, measuring or determining a temperature of the transmission 2 or of a lubricant held or circulating within the transmission 2, and determining a current gear selection of the transmission 2. The measured driveline parameter values are then typically communicated to the control unit 3.

At 304 the control unit 3 estimates a torque transmitted by the clutching device 5 at zero output torque of the electric motor 1 based on the test data collected at 301 and based on the current driveline parameter values measured or determined at 303. For example, the control unit 3 may estimate the torque transmitted by the clutching device 5 to be equal to the torque transmitted by the clutching device 5 measured at 301 which is associated with the set of driveline parameter values measured at 301 which most closely matches the set of current driveline parameter values measured at 303. Alternatively, based on the test data collected at 301, the control unit 3 may generate a continuous map or a continuous multidimensional map, for example through interpolation, wherein said map includes the torque transmitted by the clutching device 5 at output torque of the electric motor 1 as a continuous function or as a continuous multidimensional function of the set of driveline parameter values measured at 301. The estimate may then be based on the current driveline parameter values measured at 303 and on said continuous function or on said continuous multidimensional function generated on the basis of the test data collected at 301.

Figures 5A, 5B:
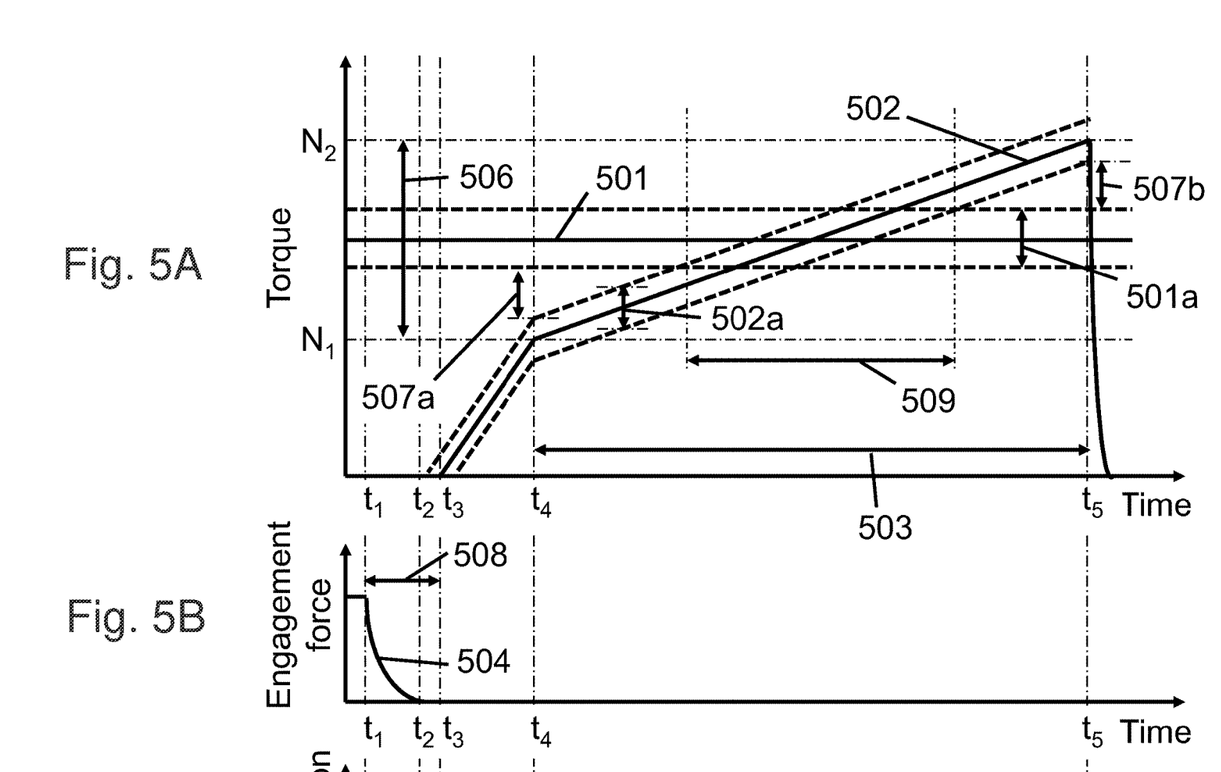
FIG. 5A schematically depicts an estimated torque transmitted by the clutching device of FIG. 1 at zero output torque of the electric motor, and a time course of a sweep of the output torque of the electric motor.
FIG. 5B schematically depicts a time course of an engagement force exerted by a clutch actuator.
Figure 5C:
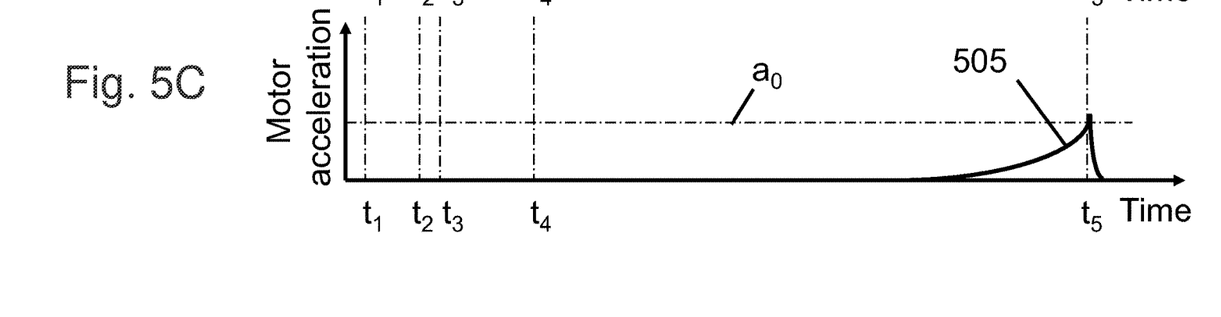
FIG. 5C schematically depicts a time course of an acceleration of the electric motor.
Figure 6A:
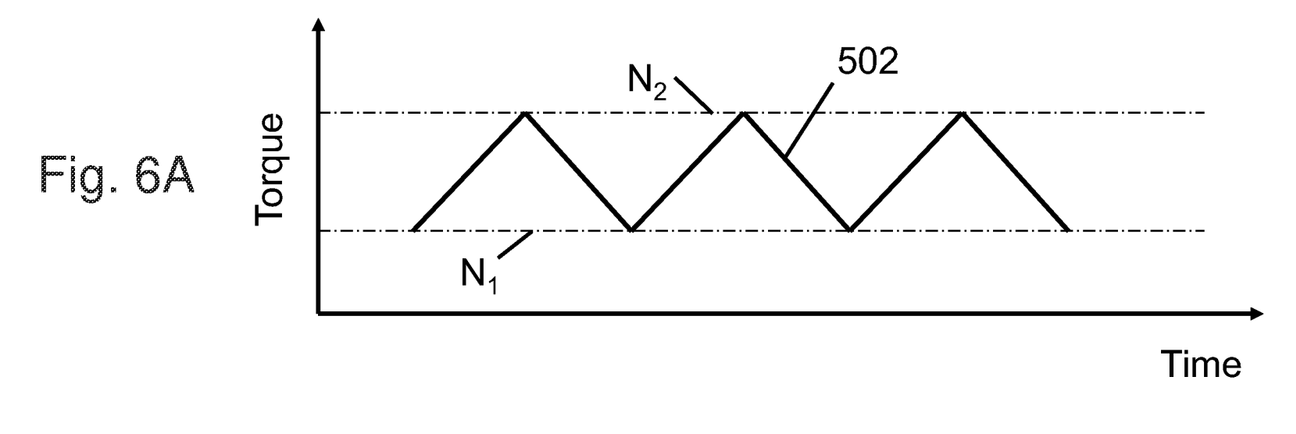
FIGS. 6A, 6B schematically depict a time course of a sweep of the output torque of the electric motor according to further embodiments.
Figure 6B:
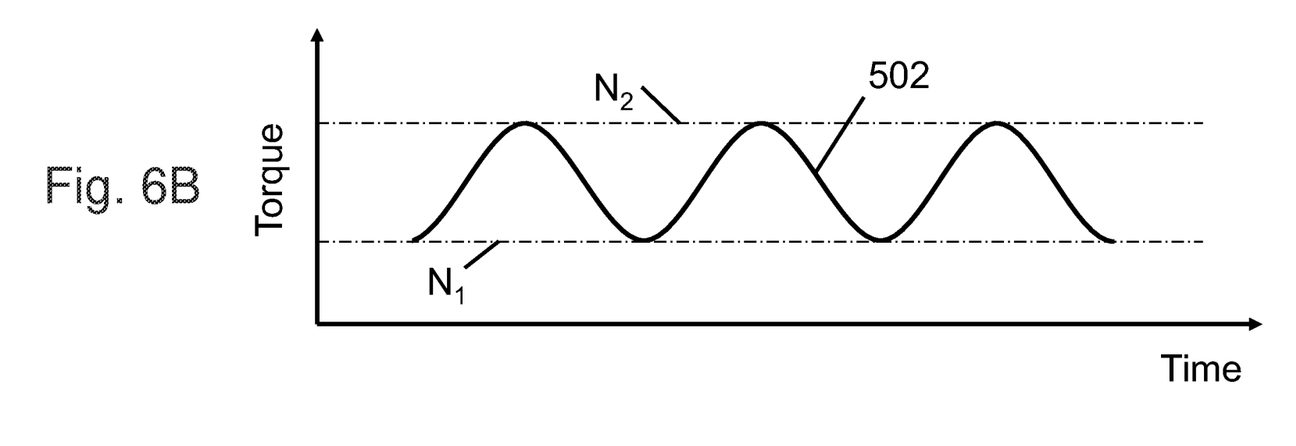

The following method steps 305 to 309 are explained with reference to FIGS. 5A-C and 6A-B. Among other things, FIG. 5A shows the torque 501 transmitted by the clutching device 5 estimated by the control unit 3 at 304, and a time course of the output torque 502 of the electric motor 1 during the sweep. FIG. 5B shows a time course of an engagement force 504 exerted by the clutch actuator 5c. FIG. 5C shows a time course of an acceleration 505 of the electric motor 1. And FIGS. 6A-b show alternative embodiments of the time course of the output torque of the electric motor 1 during the sweep, designated 502a and 502b.

At 305 the control unit 3 sets or determines sweep parameter values characterising a sweep of the output torque of the electric motor 1 to be performed subsequently. The sweep aims at decreasing or at least temporarily decreasing a force needed to disengage the input 5a and the output 5b of the clutching device 5 from one another. The sweep parameter values set or determined at 305 include a sweep start value $N_1$, a sweep end value $N_2$, and a sweep duration 503. The sweep duration 503 is the time interval during which the output torque of the electric motor 1 is swept from the sweep start value $N_1$ to the sweep end value $N_2$. The sweep start and end value $N_1$ and $N_2$ determine an amplitude of the sweep, designated 506 in FIG. 5A. FIG. 5A further illustrates an error 501a characterising the accuracy or inaccuracy of the torque estimate 501, and an error 502a characterising the accuracy or inaccuracy of the output torque 502 of the electric motor 1. The magnitude of the error 501a may stem from and/or may depend on the accuracy or inaccuracy with which the test data collected at 301 may be measured or determined, and/or on the accuracy or inaccuracy of the model underlying the previously described map or function mapping the driveline parameter values measured or determined at 301 on the torque transmitted by the clutching device 5 measured or determined at 301, for example.

The control unit 3 may determine or set the sweep start and end value $N_1$ and $N_2$ in such a way that when the output torque 502 of the electric motor 1 is swept from $N_1$ to $N_2$, the magnitude or absolute value of the output torque 502 is swept across the magnitude or absolute value corresponding to the estimate 501 of the torque transmitted by the clutching device 5 at zero output torque of the electric motor 1. Thereby, the control unit 3 takes into account a non-zero gear ratio or drive ratio between the electric motor 1 and the clutching device 5, such as a non-zero gear ratio of the transmission portion 2a. For example, the control unit 3 may choose the sweep start and end value $N_1$ and $N_2$ such that $|(N_1-N_2)/2|=|N_0|$, where $|\cdot|$ designates the absolute value and $N_0$ designates the value corresponding to the estimate 501 of the torque transmitted by the clutching device 5 at zero output torque of the electric motor 1. This parameter choice allows the output torque 502 of the electric motor 1 during the sweep to at least temporarily compensate or to at least nearly compensate the torque transmitted by the clutching device 5, thereby facilitating disengagement.

Additionally or alternatively, the control unit 3 may choose the sweep start and end value $N_1$ and $N_2$ such that $|N_1-N_2| \geq 4 \cdot \Delta N_{EM}$, where $\Delta N_{EM}$ designates the magnitude or absolute value corresponding to the error 502a characterising the control accuracy or inaccuracy of the output torque of the electric motor 1 and $|N_1-N_2|$ is or corresponds to the absolute value of the sweep amplitude 506. This parameter choice allows the output torque 502 of the electric motor 1 during the sweep to at least temporarily compensate or at least nearly compensate the torque transmitted by the clutching device 5, thereby facilitating disengagement.

Additionally or alternatively, the control unit 3 may choose the sweep start value $N_1$ such that $|N_1-N_0|>\Delta N_{EM}+\Delta N_0$, where $N_0$ and $\Delta N_{EM}$ are defined as before and $\Delta N_0$ designates the magnitude or absolute value corresponding to the error 501a of the estimate 501 of the torque transmitted by the clutching device 5 at zero output torque of the electric motor 1. As a result, at the beginning of the sweep when the output torque 502 of the electric motor 1 reaches the sweep start value $N_1$, there is a non-zero torque gap 507a between the error band 501a characterising the accuracy or inaccuracy of the torque estimate 501 and the error band 502a characterising the accuracy or inaccuracy of the output torque 502 of the electric motor 1. Additionally or alternatively, the control unit 3 may choose the sweep end value $N_2$ such that $|N_2-N_0|>\Delta N_{EM}+\Delta N_0$, where $N_0$, $\Delta N_{EM}$ and $\Delta N_0$ are defined as before. As a result, at the end of the sweep when the output torque 502 of the electric motor 1 reaches the sweep end value $N_2$, there is a non-zero torque gap 507b between the error band 501a characterising the accuracy or inaccuracy of the torque estimate 501 and the error band 502a characterising the accuracy or inaccuracy of the output torque 502 of the electric motor 1. Again, this parameter choice allows the output torque 502 of the electric motor 1 during the sweep to at least temporarily compensate or to at least nearly compensate the torque transmitted by the clutching device 5, thereby facilitating disengagement.

The control unit 3 typically sets the sweep duration 503 to be equal to or shorter than a predetermined maximum duration. For example, the control unit 3 may set the sweep duration 503 to be at most 500 ms, at most 200 ms, at most 100 ms, or at most 50 ms.

Back to FIG. 3, at 306 the control unit 3 controls the actuator 5c to disengage the input 5a and the output 5b of the clutching device 5 from one another, or to allow the input 5a and the output 5b of the clutching device 5 to disengage. In the embodiment depicted in FIGS. 5A-C this includes the actuator 5c decreasing an engagement force 504 which forces or biases the input 5a and the output 5b of the clutching device 5 into the closed position or into engagement, for example against an opening force of a biasing member such as a spring biasing the clutching device towards the open or disengaged position. In FIGS. 5A-C, the actuator 5c to decreases the engagement force 504 at a point in time $t_1$. At a point in time $t_2$ ($t_2>t_1$) the engagement force 504 drops to zero so that the clutching device 5 may disengage or open once a torque transmitted by the clutching device 5 falls below a threshold value.

At a point in time $t_3$ ($t_3>t_2$) the control unit 3 starts ramping the output torque 502 of the electric motor 1 to the sweep start value $N_1$. In the embodiment depicted in FIGS. 5A-C ramping the output torque 502 of the electric motor 1 to the sweep start value $N_1$ includes increasing the output torque 502. It is understood that in alternative embodiments ramping the output torque 502 of the electric motor 1 to the sweep start value $N_1$ may include decreasing the output torque 502. As further indicated in FIGS. 5A-C, once the actuator 5c has started decreasing the engagement force 504 at $t_1$, the control unit 3 starts ramping the output torque 502 of the electric motor 1 to the sweep start value $N_1$ only after a minimum delay time 508 has passed. For example, in this way it may be ensured that the engagement force 504 does not overlap with the subsequent sweep of the output torque 502 of the electric motor 1. For instance, the delay time 508 may be at least 5 ms, at least 10 ms, or at least 50 ms.

At a point in time $t_4$ ($t_4>t_3$) the method depicted in FIG. 3 proceeds to step 307, and the output torque 502 of the electric motor 1 reaches the sweep start value $N_1$. At 307, the control unit 3 begins sweeping the output torque 502 of the electric motor 1 according to the sweep parameter values determined at 305. At the same time, the control unit 3 may monitor an acceleration 505 of the electric motor, as illustrated in FIG. 5C. As the output torque 502 of the electric motor 1 is typically non-zero during the sweep, disengagement of the clutching device 5 during and/or right after the sweep usually results in a sudden acceleration of the electric motor 1. Or in other words, a sudden acceleration of the electric motor 1 during and/or right after the sweep usually indicates that the clutching device 5 has opened or disengaged. As compared to using conventional measurement sensors such as position sensors to indicate disengagement of the clutching device 5, monitoring the acceleration of the electric motor 1 during and/or right after the sweep may indicate disengagement of the clutching device 5 faster and thus with improved temporal precision. The acceleration of the electric motor 1 during and/or right may be monitored using an internal speed sensor of the electric motor 1 or another speed sensor configured to measure the speed of a driveline component connecting the electric motor 1 to the input 5a of the clutching device 5.

In the embodiment depicted in FIGS. 5A-C, the control unit 3 performs a single linear sweep of the output torque 502 from the sweep start value $N_1$ to the sweep end value $N_2$ within the predetermined sweep duration 503. However, it is understood that in alternative embodiments sweeping the electric motor output torque 502 at 304 may include repeated sweeps between the sweep start value $N_1$ and the sweep end value $N_2$, as schematically illustrated in FIG. 6A. It is further understood that in alternative embodiments the time course of the output torque 502 during the sweep may be non-linear. For instance, the control unit 3 may control the electric motor 1 in such a way that the output torque 502 of the electric motor 1 during the sweep follows a sinusoidal time course, as schematically illustrated in FIG. 6B.

As described above, the control unit 3 sweeps the output torque 502 of the electric motor 1 in such a way that the magnitude or absolute value of the output torque 502 is swept across the magnitude or the absolute value of the estimate 501 of the torque transmitted by the clutching device 5 at zero output torque of the electric motor 1.

The direction of the output torque 502 of the electric motor 1 during the sweep is such that the torque transmitted by the clutching device 5, which is drivingly connected to the electric motor 1, and the output 5b of the clutching device 5 vanishes at least temporarily during the sweep. For example, if, based on the driveline parameter values determined or measured at 303 and according to the torque 501 estimated at 304, at zero output torque of the electric motor 1 the output 5b exerts a net torque on the input 5a pointing in a direction 7 along the rotation axis 6 of the clutching device 5 (see FIGS. 1 and 2B), then at 307 during the sweep the electronic control unit 3 controls the electric motor 1 in such a way that the output torque 502 of the electric motor 1 exerts a torque on the input 5a pointing in the same direction 7 along the rotation axis 6 of the clutching device 5. In this manner, during the sweep the torque the electric motor 1 exerts on the clutching device 5 at least temporarily compensates the estimated value 501 of the torque transmitted by the clutching device 5 at zero electric motor output torque. Consequently, during the sweep the actual torque transmitted by the clutching device 5 resulting from both frictional and inertial forces within the driveline 100 and the compensating output torque 502 of the electric motor 1 vanishes at least temporarily, thereby facilitating disengagement of the clutching device during the sweep.

Disengagement of the clutching device 5 typically occurs during a time interval 509 where the estimated transmitted torque 501 at zero electric motor output torque and the output torque 502 of the electric motor during the sweep overlap within their margins or error 501a and 502a. The time interval 509 is a subinterval of the sweep interval 503. In FIGS. 5A-C disengagement of the clutching device 5 during the time interval 509 is indicated by a sudden increase in the acceleration 505 of the electric motor 1. For example, the control unit 3 may be configured to determine that the clutching device 5 has opened or disengaged when or once the acceleration 505 or an absolute value of the acceleration 505 of the electric motor 1 during the sweep exceeds a predetermined acceleration threshold $a_0$, as indicated in FIG. 5C. In the embodiment depicted in FIGS. 5A-C the point in time at which the acceleration 505 exceeds the predetermined acceleration threshold $a_0$ and the control unit 3 determines that the clutching device 5 has been opened or disengaged coincides with the end of the electric motor output torque sweep at $t_5$. However, it is understood that in alternative embodiments the acceleration 505 of the electric motor 1 may exceed the predetermined acceleration threshold $a_0$ before or after the end of the sweep.

In the embodiment depicted in FIGS. 5A-C, once the control unit 3 determines that the acceleration 505 of the electric motor 1 exceeds the predetermined threshold $a_0$, the control unit 3 reduces the output torque 502 of the electric motor 1 to zero, for example in order to prevent the speed of the electric motor 1 to increase further. However, it is understood that in alternative embodiments the control unit 3 may reduce the output torque 502 to a non-zero value, that the control unit 3 may keep the output torque 502 unchanged, or that the control unit 3 may increases the output torque 502 once it determines that the acceleration 505 of the electric motor 1 exceeds the predetermined threshold $a_0$. It is further conceivable that the control unit 3 is configured to initiate or trigger one or more further control procedures when or once it determines that that the acceleration 505 of the electric motor 1 exceeds the predetermined threshold $a_0$ during or right after the sweep, such as opening or closing another clutching device, or increasing or decreasing the output torque of another motor, for example.

The invention claimed is:

1. A method of disengaging a clutching device, the method comprising:
    sweeping an output torque of an electric motor drivingly connected to the clutching device such that a torque transmitted by the clutching device vanishes at least temporarily during the sweep, and
    disengaging the clutching device during the sweep;
    wherein the output torque of the electric motor is reduced to zero when or once an acceleration of the electric motor following disengagement of the clutching device exceeds a predetermined threshold.

2. The method of claim 1, further comprising estimating, before or right before the sweep, the torque transmitted by the clutching device at zero output torque of the electric motor, wherein the sweeping of the output torque includes sweeping the output torque across an output torque value having a magnitude which corresponds to the magnitude of the estimated torque transmitted by the clutching device at zero output torque of the electric motor.

3. The method of claim 2, wherein the torque transmitted by the clutching device at zero output torque of the electric motor is estimated based on one or more driveline parameter values including one or more of:
    a speed of the electric motor,
    the acceleration of the electric motor,
    a gear selection, and
    a transmission temperature.

4. The method of claim 2, wherein the torque transmitted by the clutching device at zero output torque of the electric motor is estimated based on test data mapping one or more driveline parameter values including one or more of:
    speed values of the electric motor,
    acceleration values of the electric motor,
    different gear selections, and
    transmission temperature values
    to values of the torque transmitted by the clutching device at zero output torque of the electric motor.

5. The method of claim 1, wherein an amplitude of the sweep is at least four times an output torque control error of the electric motor.

6. The method of claim 1, wherein disengagement of the clutching device is initiated before the sweep or at the beginning of the sweep.

7. An electric driveline, including:
    an electric motor,
    a clutching device drivingly connected to the electric motor, and
    a control unit with instructions stored in memory configured to sweep an output torque of the electric motor such that a torque transmitted by the clutching device vanishes at least temporarily during the sweep, and configured to disengage the clutching device during the sweep;
    wherein the control unit is further configured to estimate, before or right before the sweep, the torque transmitted by the clutching device at zero output torque of the electric motor, and to sweep the output torque across an output torque value having a magnitude which corresponds to the magnitude of the estimated torque transmitted by the clutching device at zero output torque of the electric motor.

8. The electric driveline of claim 7, wherein the control unit is configured to estimate the torque transmitted by the clutching device at zero output torque of the electric motor based on one or more driveline parameters or based on one or more driveline parameter values including one or more of:
- a speed of the electric motor,
- an acceleration of the electric motor,
- a gear selection, and
- a transmission temperature.

9. The electric driveline of claim 8, wherein the control unit is configured to estimate the torque transmitted by the clutching device at zero output torque of the electric motor based on test data mapping one or more driveline parameter values including one or more of:
- speed values of the electric motor,
- acceleration values of the electric motor,
- different gear selections, and
- transmission temperature values
- to values of the torque transmitted by the clutching device at zero output torque of the electric motor.

10. The electric driveline of claim 7, wherein the control unit is configured to sweep the output torque of the electric motor such that an amplitude of the sweep is at least four times an output torque control error of the electric motor.

11. The electric driveline of claim 7, wherein the control unit is configured to initiate disengagement of the clutching device before the sweep or at the beginning of the sweep by means of an electromagnetic actuator.

12. The electric driveline of claim 7, wherein the control unit is configured to reduce the output torque of the electric motor to zero when or once an acceleration of the electric motor following disengagement of the clutching device exceeds a predetermined threshold.

13. The electric driveline of claim 7, wherein the clutching device includes a dog clutch.

14. The electric driveline of claim 7, wherein the clutching device includes a synchronizer.

15. An electric driveline of a vehicle, including:
- an electric motor configured to drive a wheel of the vehicle,
- a clutching device drivingly connected to the electric motor having one or more position sensors in communication with a control unit, and
- the control unit with instructions stored in memory configured to sweep an output torque of the electric motor such that a torque transmitted by the clutching device vanishes at least temporarily during the sweep, and configured to disengage the clutching device during the sweep, wherein sweeping the output torque of the electric motor includes continuously and monotonously increasing and decreasing the output torque of the electric motor.

* * * * *